(12) United States Patent
Balanayagam et al.

(10) Patent No.: US 6,965,821 B1
(45) Date of Patent: Nov. 15, 2005

(54) TILT IN REVERSE MIRROR

(75) Inventors: Sivapalan Balanayagam, Lasalle (CA); Patrick D Dean, Armada, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 17 days.

(21) Appl. No.: 10/886,114

(22) Filed: Jul. 7, 2004

(51) Int. Cl.$^7$ .............................................. B60R 1/72
(52) U.S. Cl. .................... 701/48; 359/696; 359/877; 307/10.1
(58) Field of Search ................................ 701/1, 36, 49; 359/696, 877; 307/9.1, 10.1; 340/654

(56) References Cited

U.S. PATENT DOCUMENTS

| | | | |
|---|---|---|---|
| 4,936,671 A | 6/1990 | Kaspar | |
| 5,315,442 A * | 5/1994 | Sato et al. | 359/877 |
| 5,990,649 A * | 11/1999 | Nagao et al. | 318/568.1 |
| 6,093,976 A * | 7/2000 | Kramer et al. | 307/10.1 |
| 6,094,027 A * | 7/2000 | Willmore et al. | 318/652 |
| 6,580,992 B2 | 6/2003 | Whitten et al. | |
| 6,867,510 B2 * | 3/2005 | Kramer et al. | 307/10.1 |

* cited by examiner

Primary Examiner—Richard M. Camby
(74) Attorney, Agent, or Firm—Ralph E. Smith

(57) ABSTRACT

A system and method are provided for selectively tilting side mirrors located on the driver and passenger sides of a vehicle. The system has a mirror selection switch with a driver position and a passenger position. A control module receives a mirror selection signal from the mirror selection switch and receives a reverse gear signal. A first actuator is controlled by the control module and linked to a passenger side mirror. The control module controls the first actuator to tilt the passenger side mirror when the mirror selection signal indicates the mirror selection switch is in the passenger position and the reverse gear signal is indicative of the vehicle being in a reverse gear.

5 Claims, 2 Drawing Sheets

TILT IN REVERSE MIRROR

FIELD OF THE INVENTION

The present invention relates to generally to control systems for manipulating the position of vehicle side mirrors, and more particularly to such systems which manipulate the position depending on the intended direction of travel of the vehicle.

BACKGROUND OF THE INVENTION

Motor vehicle side mirrors generally leave the vehicle operator with blind spots on both sides of the vehicle near the vehicle body. The blind spots can be a nuisance to the operator when backing-up the vehicle such as when parking.

One method of reducing or eliminating the blind spot is to provide an actuator which moves the mirrors when the vehicle is placed in a reverse gear. When the vehicle is placed in a reverse gear, the actuator tilts the side mirrors downward to allow the operator to see into the previous blind spot and thereby avoid object in close proximity to the rear of the vehicle. Examples of such systems are provided by Kaspar, U.S. Pat. No. 4,936,671 and Whitten et al., U.S. Pat. No. 6,580,992.

A disadvantage of such systems is that it is not always desirable to tilt the mirrors downward when backing up. In some instances, such as when backing a trailer, it is desirable to leave the side mirrors in their normal positions so that the operator can see the trailer in the mirrors while backing up. If the mirrors were tilted down, the trailer would disappear from the operator's view in the mirrors. In an effort to accommodate this type of situation, it is known to provide a means for disabling the tilt-in-reverse function. One such method utilizes a menu system through an on-board computer to enable and disable the function. Since it takes considerable time to navigate the menu system, such an arrangement is only undesirably suitable for vehicle operators needing to frequently disable or enable the tilt-in-reverse function.

SUMMARY OF THE INVENTION

To address the identified need in the art, a system is provided for selectively tilting side mirrors located on the driver and passenger sides of a vehicle. The system has a mirror selection switch with a driver position and a passenger position. A control module receives a mirror selection signal from the mirror selection switch and receives a reverse gear signal. A first actuator is controlled by the control module and linked to a passenger side mirror. The control module controls the first actuator to tilt the passenger side mirror when the mirror selection signal indicates the mirror selection switch is in the passenger position and the reverse gear signal is indicative of the vehicle being in a reverse gear.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
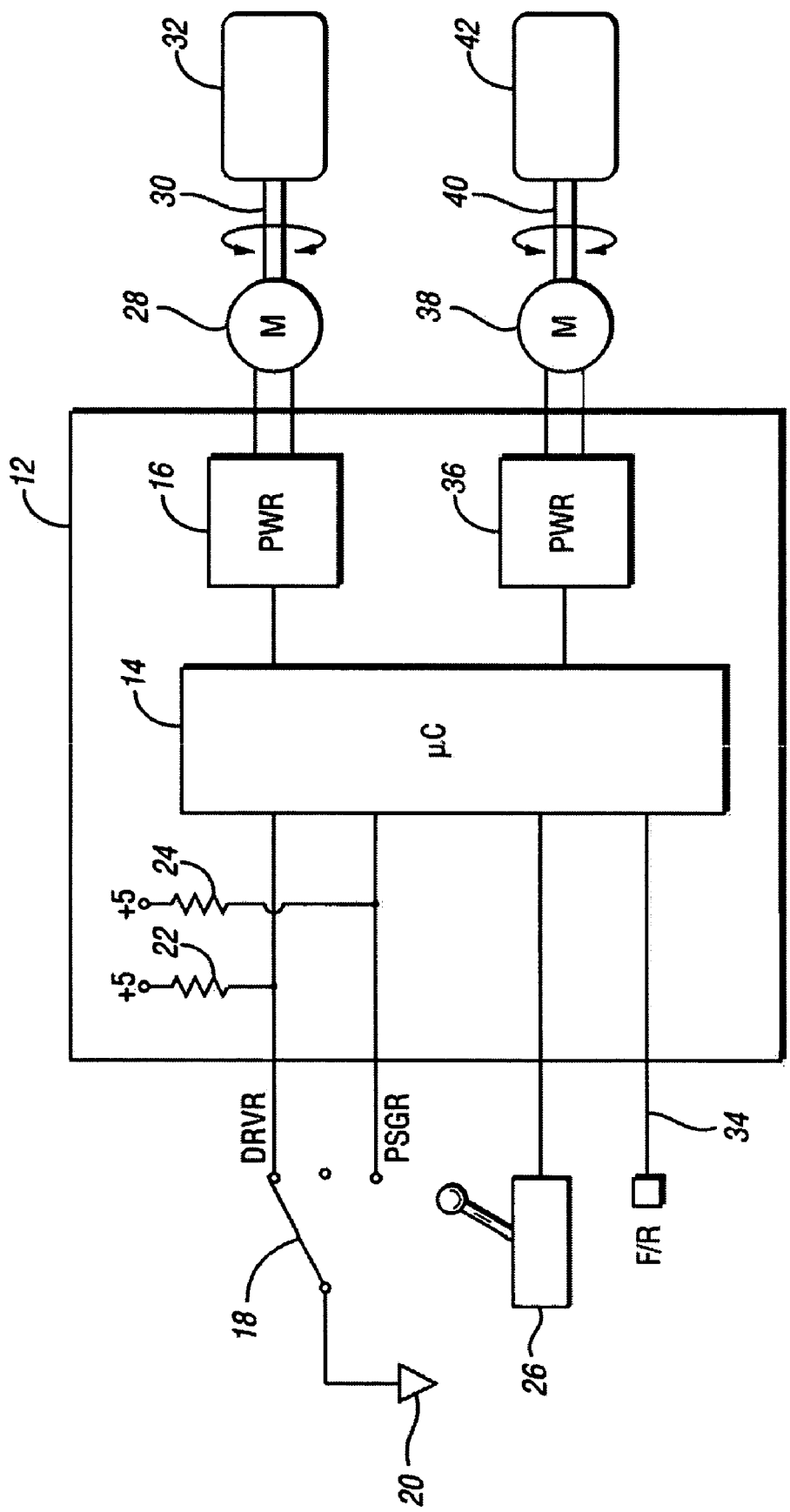
FIG. 1 shows a circuit block diagram of a mirror control system.

Turning to FIG. 1, a circuit block diagram of a mirror control system is shown. A module 12 contains a microcontroller 14 having on-board memory for holding a computer program which is described later. A mirror selection switch 18 has three positions—driver (DRVR), passenger (PSGR) and none (the center position). A common terminal of the switch 18 is connected to ground 20. One end of a pull-up resistor 22 is connected to the DRVR terminal of the switch 18 and the other end of the pull-up resistor 22 is connected to +5V. A similar pull-up arrangement is provided at the PSGR terminal of the switch 18 by pull-up resistor 24. The microcontroller determines the switch position by reading the voltages of the DRVR and PSGR switch terminals. When the voltage at the DRVR terminal is zero, then the switch is in the DRVR position. When the voltage at the PSGR terminal is zero, then the switch is in the PSGR position. When the DRVR and PSGR terminals at +5V then the switch is in the center position. While a single-pole, three position switch arrangement is shown and described, the microcontroller 14 may also obtain a mirror selection signal from other switch types, such as single wire resistive multiplex switch, or from a message arriving through a network connection.

A joystick 26 is connected to the microcontroller 14 and is used by an operator to adjust the mirror selected by switch 18 to a desired preset position suitable for forward driving.

A driver's side mirror 32 is coupled via link 30 to a positioning motor 28. The motor 32 tilts the mirror up and down depending on the electrical signal provided by a power circuit 16. The power circuit 16 is controlled by the microcontroller 14. A passenger side mirror 42 is controlled by similar connections between the microcontroller 14, power circuit 36, and a link 40. While electric motors are shown, any electric actuators, such as electromagnets, may be substituted for the motors and used to position the mirrors.

A reverse gear signal 34 is provided to the microcontroller 14 and is used to determine when the vehicle transmission is in a reverse gear. The input may be implemented by a hardwired switch to the transmission or its shifter, or by a network message arriving over a network connection. The microcontroller 14 uses the mirror selection signal and the reverse gear signal to position the side mirrors 32, 42 in accordance with the following method.

Figure 2:
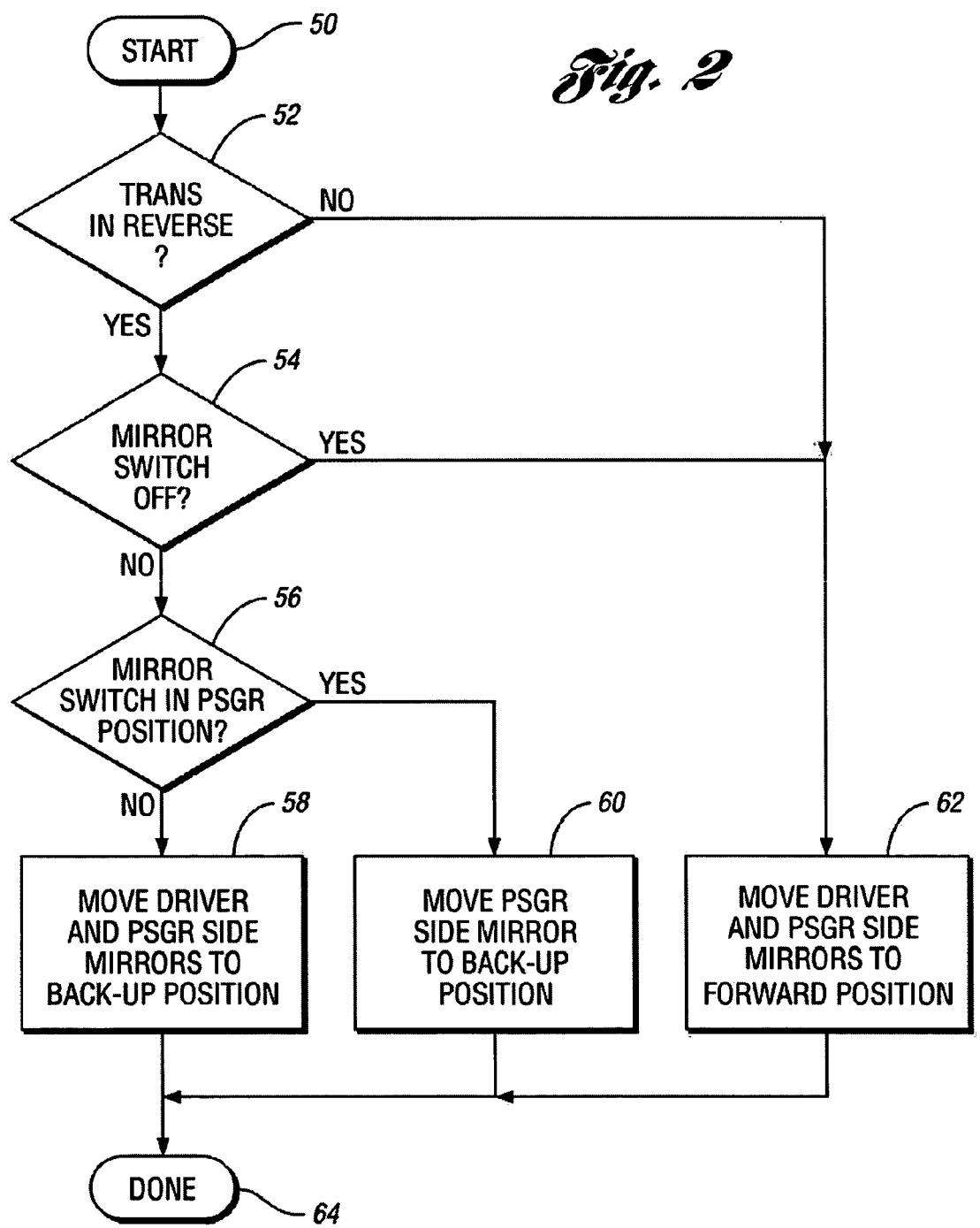
FIG. 2 shows a flowchart of the mirror control logic.

Turning now to FIG. 2, a method is shown. The method may be executed by microcontroller 14 and stored in its memory. In a preferred embodiment, the method is executed periodically, for example every 30 mS.

The method begins at block 50 and proceeds to decision block 52 to determine whether the vehicle transmission is in a reverse gear. If not, then the method proceeds to block 62 and tilts the mirrors to a preset position for forward driving. Returning to decision block 52, if the vehicle transmission is in a reverse gear, then the method proceeds to decision block 54. In block 54 the method determines whether the mirror selection switch 18 is in the off, i.e. center, position. If so, then the method again proceeds to block 62 and tilts the mirrors to a preset position for forward driving. Returning to decision block 54, if the mirror selection switch is in a position other than off then the method proceeds to decision block 56. In decision block 56 the method determines whether the mirror selection switch is in the PSGR position. If so, then the method proceeds to block 60 and tilts the PSGR mirror 42 by a predetermined amount to a backing-up position, and positions the DRVR mirror 32 to a preset position for forward driving. Returning to decision block 56, if the result of the query is negative then the method proceeds to block 58 and tilts the DRVR and PSGR mirrors 32, 42 by predetermined amounts to backing-up positions. Once the method has positioned the mirrors according to blocks 58, 60, or 62, the method exits via block 64.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for selectively tilting side mirrors located on the driver and passenger sides of a vehicle, method comprising:
   a mirror selection switch having a driver position and a passenger position,
   a control module receiving a mirror selection signal from said mirror selection switch and receiving a reverse gear signal, and
   a first actuator controlled by said control module and linked to a passenger side mirror, said control module controlling said first actuator to tilt said passenger side mirror when said mirror selection signal indicates said mirror selection switch is in said passenger position and said reverse gear signal is indicative of the vehicle being in a reverse gear.

2. The system of claim 1 further comprising a second actuator controlled by said control module and linked to a driver side mirror, said control module controlling said first actuator to tilt said passenger side mirror and controlling said second actuator to tilt said driver side mirror when said mirror selection signal indicates said mirror selection switch in said driver position and said reverse gear signal is indicative of the vehicle being in a reverse gear.

3. The system of claim 1 wherein said actuator comprises an electric motor.

4. The system of claim 1 further comprising a network connection to said control module, said control module receiving at least one of said mirror selection switch signal and said reverse gear signal via said network connection.

5. A method for positioning driver side and passenger side mirrors in a vehicle having a mirror selection switch and a reverse gear, said method comprising:
   determining whether the vehicle is in a reverse gear,
   determining whether the mirror selection switch is in one of a driver and a passenger position,
   tilting the passenger side mirror when the vehicle is in said reverse gear and the mirror selection switch is in said passenger position, and
   tilting the passenger side mirror and the driver side mirror when the vehicle is in said reverse gear and the mirror selection switch is in said driver position.

* * * * *